Patented June 15, 1926.

1,588,510

UNITED STATES PATENT OFFICE.

WILLIAM S. WEAR, OF EXCELSIOR SPRINGS, MISSOURI.

SILVER-GLASS-MIRROR MAKING.

No Drawing.    Application filed August 25, 1923. Serial No. 659,416.

This invention relates to silvered glass mirror making, and an object of the invention is to provide a method and solution whereby mirrors of the above kind may be cheaply and easily made and whereby a good and durable product is assured.

Another object of the invention is to generally simplify and improve existing methods of making mirrors of the above kind and to provide improved solutions for use in carrying out the present method.

Other objects will appear as the nature of the invention is better understood and the same consists in the novel method, steps, and solutions hereinafter more fully described, and pointed out in the appended claim.

In making silvered glass mirrors in accordance with the present invention, it is necessary to have three chemical solutions, i. e., silver solutions, a solution containing Rochelle salts, and tin chloride solution, the silver salt solutions and the solution containing Rochelle salts being added together in certain proportions as will hereinafter become apparent.

The silver solution may be prepared in the following manner and proportion of ingredients: 5 ounces of 28% concentrated ammonia are placed in a clean glass pitcher and to this ammonia is added 8 ounces of silver nitrate crystals, the ingredients being agitated by any suitable means. One ounce of substantially 28% concentrated ammonia is then added at approximately one-fourth of an ounce at a time and at intervals of two or three minutes, thus making a total of six ounces of the concentrated ammonia that is used. The ingredients are thoroughly mixed by agitating the same while adding the ammonia, and then 28 ounces of distilled water is added after which the solution is filtered.

The Rochelle salts solution may be prepared in a clean porcelain vessel, and to prepare the same, sixteen ounces of distilled water are placed in the vessel, after which two ounces of Rochelle salts (powdered) are added. The vessel is then placed on a fire and allowed to come to a steam, as distinguished from boiling, after which the vessel is removed from the fire for allowing the solution to cool. The solution is then filtered and is ready for use.

The tin chloride solution or sizing consists of 20 grains of tin chloride crystals (stannous chloride), added to a quart of distilled water and well shaken.

In addition to the above solution, the invention contemplates the use of a mixture herein termed the "hot flow." The ingredients and portions of this hot flow are one pint of distilled water, two ounces of Rochelle salts solution and one quarter of an ounce of silver salt solution. The hot flow is prepared by placing the distilled water in a porcelain vessel and then heating the water, after which the Rochelle salts solution is added. After the mixture of Rochelle salts and distilled water has been boiled, the vessel is removed from the fire and the silver salt solution is added.

When it is desired to silver a piece of glass to form a mirror in accordance with the present invention, the glass is cleaned and polished thoroughly and is then placed in a perfectly level horizontal position with the surface to be coated disposed upward. A sufficient quantity of the tin chloride solution is then applied by rubbing the same over the entire surface of the glass with a sponge after which this solution is entirely rinsed off with warm water and then again rinsed with hot distilled water. This tin chloride or sizing solution tins the glass and helps to magnify.

Assuming that the glass that has thus been cleaned, polished, levelled, and sized is eighteen by forty inches in size, the quantity of solutions used and manner of applying the same will be as follows:

Ten ounces of cold distilled water are placed in a glass vessel together with four ounces of hot distilled water and four ounces of Rochelle salts solution are then added, the resultant mixture being suitably mixed. The glass is then rinsed off with hot distilled water and one ounce of silver salt solution is added to the mixture of Rochelle salts solution and water while being agitated. This mixture of silver salt solution, Rochelle salts solution and water is then applied to the glass at once, while the latter is wet. The mixture is preferably poured in the center of the glass first until this is covered and without stopping, is then poured on the four corners and edges until all of the surface is entirely covered. The glass thus seated, is allowed to stand for thirty or forty minutes and then the hot flow is applied for increasing the brilliancy and durability of the mirror and for hardening the silver. The hot flow should be warm when applied but not boiling and is allowed to remain on the glass for three to five minutes after which it is drained off of the same. A clean chamois skin is then utilized to pick up the salt solution deposits from the glass until said deposit is entirely removed, and then the glass is allowed to completely dry.

When the glass is completely dry after being treated as above described, a thin coat of shellac is applied and when the shellac is dry the usual mirror backing paint is applied. Should any small places be discovered on the glass, which did not "take," the silver salt solution, this may be remedied by a basting operation before shellacing, in the following manner. A small amount of hot distilled water may be then poured on the spot thus found, and then more of the solutions in the same proportions as at first applied. This properly silvers the bare spot and strengthens weak spots of the silver.

From the foregoing description, it is believed that the invention and its advantages will be readily understood and appreciated by those skilled in the art.

Minor changes may be made without departing from the spirit and scope of the invention as claimed.

What I claim as new is:—

A method of silvering glass consisting in placing the glass to be treated in a substantially horizontal plane, cleaning the surface of the glass, applying a solution of tin chloride to the cleaned surface, washing the surface with hot water to remove excess chloride solution, mixing and applying a solution to the surface thus treated while said surface is wet, said solution having a proportion of 10 ounces of cold water, 4 ounces of hot water, and 4 ounces of a solution formed of 2 ounces of Rochelle salts and 16 ounces of water, mixed with 1 ounce of a solution containing 8 ounces of silver nitrate and 6 ounces of 28% concentrate of ammonia, permitting the solution thus applied to remain on the surface a predetermined length of time, then applying a hot solution containing 1 pint of water, 2 ounces of a solution formed of 16 ounces of distilled water mixed with 2 ounces of Rochelle salts and ¼ ounce of an additional solution formed of 8 ounces of silver nitrate mixed with 6 ounces of 28% concentrate of ammonia, and subsequently cleaning the surface of the glass and permitting the same to dry.

In testimony whereof I affix my signature.

WILLIAM S. WEAR.